United States Patent
Abe

(10) Patent No.: US 8,144,207 B2
(45) Date of Patent: Mar. 27, 2012

(54) COMPUTER PROGRAM PRODUCT FOR PHOTOGRAPHIC SUBJECT TRACKING, PHOTOGRAPHIC SUBJECT TRACKING DEVICE, AND CAMERA

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 244 days.

(21) Appl. No.: 12/311,472

(22) PCT Filed: Nov. 15, 2007

(86) PCT No.: PCT/JP2007/072195
§ 371 (c)(1),
(2), (4) Date: Mar. 31, 2009

(87) PCT Pub. No.: WO2008/059926
PCT Pub. Date: May 22, 2008

(65) Prior Publication Data
US 2009/0322894 A1 Dec. 31, 2009

(30) Foreign Application Priority Data
Nov. 15, 2006 (JP) ................. 2006-308940

(51) Int. Cl.
*H04N 5/222* (2006.01)
(52) U.S. Cl. ............... 348/222.1; 348/169; 348/208.14; 382/103; 382/209
(58) Field of Classification Search ............... 348/169, 348/208.14, 222.1; 382/103, 107, 209, 215–219
See application file for complete search history.

(56) References Cited

U.S. PATENT DOCUMENTS

| 5,943,442 A * | 8/1999 | Tanaka et al. ............. 382/216 |
| 6,445,409 B1 * | 9/2002 | Ito et al. ............. 348/155 |
| 6,687,386 B1 * | 2/2004 | Ito et al. ............. 382/103 |
| 7,400,344 B2 * | 7/2008 | Ito et al. ............. 348/169 |
| 7,545,977 B2 * | 6/2009 | Ikeda et al. ............. 382/165 |
| 2002/0039438 A1 * | 4/2002 | Mori et al. ............. 382/154 |
| 2007/0110321 A1 * | 5/2007 | Okada et al. ............. 382/209 |

FOREIGN PATENT DOCUMENTS

| JP | U-04-001473 | 1/1992 |
| JP | A-08-279044 | 10/1996 |
| JP | A-2001-060269 | 3/2001 |
| JP | A-2004-118485 | 4/2004 |

OTHER PUBLICATIONS

Office Action mailed Dec. 6, 2011 in corresponding Japanese Patent Application No. 2006-308940. (with English language translation).

* cited by examiner

*Primary Examiner* — Tuan Ho
*Assistant Examiner* — Kent Wang
(74) *Attorney, Agent, or Firm* — Oliff & Berridge, PLC

(57) ABSTRACT

A computer executes performing template matching upon each frame of an input image with each of a plurality of template images, extracting a plurality of regions whose similarities with each of the template images are the highest from within the input image, classifying the extracted regions into regions that are to be used for specifying a photographic subject position within the input image and another region, on the basis of the mutual distances between the extracted regions within the input image, specifying the photographic subject position, on the basis of the positions of the regions that have been classified as the regions that are to be used for specifying the photographic subject position within the input image, and tracking the movement of the photographic subject over the image consisting of a plurality of frames, by tracking the photographic subject position between frames.

15 Claims, 10 Drawing Sheets

COMPUTER PROGRAM PRODUCT FOR PHOTOGRAPHIC SUBJECT TRACKING, PHOTOGRAPHIC SUBJECT TRACKING DEVICE, AND CAMERA

TECHNICAL FIELD

The present invention relates to a computer program product for photographic subject tracking that stores a photographic subject tracking program that performs tracking of a photographic subject over a plurality of frames, and to a photographic subject tracking device and a camera.

BACKGROUND ART

The following type of object tracking device is known. This object tracking device is one that tracks a photographic subject present in an image over frames by performing matching processing upon frame images that are inputted, using a template image that is prepared in advance (refer to Patent Reference #1).

Patent Reference #1: Japanese Laid-Open Patent Publication No. 2001-60269

DISCLOSURE OF THE INVENTION

Problems to be Solved by the Invention

However, with such a prior art device, if the change over time between the images of frames that are inputted is abrupt, then false matching can easily occur, so that there is a possibility that the accuracy with which the photographic subject is tracked will decrease.

Means for Solving the Problems

In a computer program product according to a first aspect of the present invention that stores a program executed by a computer for tracking the movement of a photographic subject over an image consisting of a plurality of frames inputted in time series, the program for the computer to execute the following steps is stored: a template matching step of performing template matching upon each frame of an input image with each of a plurality of template images and extracting a plurality of regions whose similarities with each of the template images are the highest from within the input image; a classification step of classifying the extracted regions into regions that are to be used for specifying a photographic subject position within the input image and another region, on the basis of the mutual distances between the extracted regions within the input image; a specification step of specifying the photographic subject position, on the basis of the positions of the regions that have been classified by the classification step as the regions that are to be used for specifying the photographic subject position within the input image; and a photographic subject tracking step of tracking the movement of the photographic subject over the image consisting of a plurality of frames, by tracking the photographic subject position between frames.

According to a second aspect of the present invention, in the computer program product of the first aspect, the classification step takes a group of half or more of regions whose mutual distances are closer among the extracted regions, as being the regions to be used for specifying the photographic subject position.

According to a third aspect of the present invention, in the computer program product of the first or second aspect, it is preferable that the specification step specifies the position of the barycenter between representative points that are set within the regions used for specifying the photographic subject position, as being the photographic subject position.

According to a fourth aspect of the present invention, in the computer program product of any one of the first through third aspects, it is desirable that each of the template images includes a plurality of template images for updating that have been photographed at different times, and the computer further executes a decision step of deciding whether or not the result of matching by the template matching step satisfies an update condition for updating the template images for updating, and an updating step of updating at least one of the template images for updating, if the decision step has decided that the update condition is satisfied.

According to a fifth aspect of the present invention, a photographic subject tracking device includes an execution unit that executes the program stored upon the computer program product of any one of the first through fourth aspects.

According to a sixth aspect of the present invention, a camera includes an image-capturing unit that captures an image of a photographic subject and outputs an image signal, and an execution unit that executes the program stored upon the computer program product of any one of the first through fourth aspects, and, on the basis of the image signal outputted from the image-capturing unit, the execution unit tracks the movement of the photographic subject over an image consisting of a plurality of frames inputted in time series.

Advantageous Effect of the Invention

According to the present invention, it is possible to perform photographic subject tracking at high accuracy.

BEST MODES FOR CARRYING OUT THE INVENTION

First Embodiment

Figure 1:
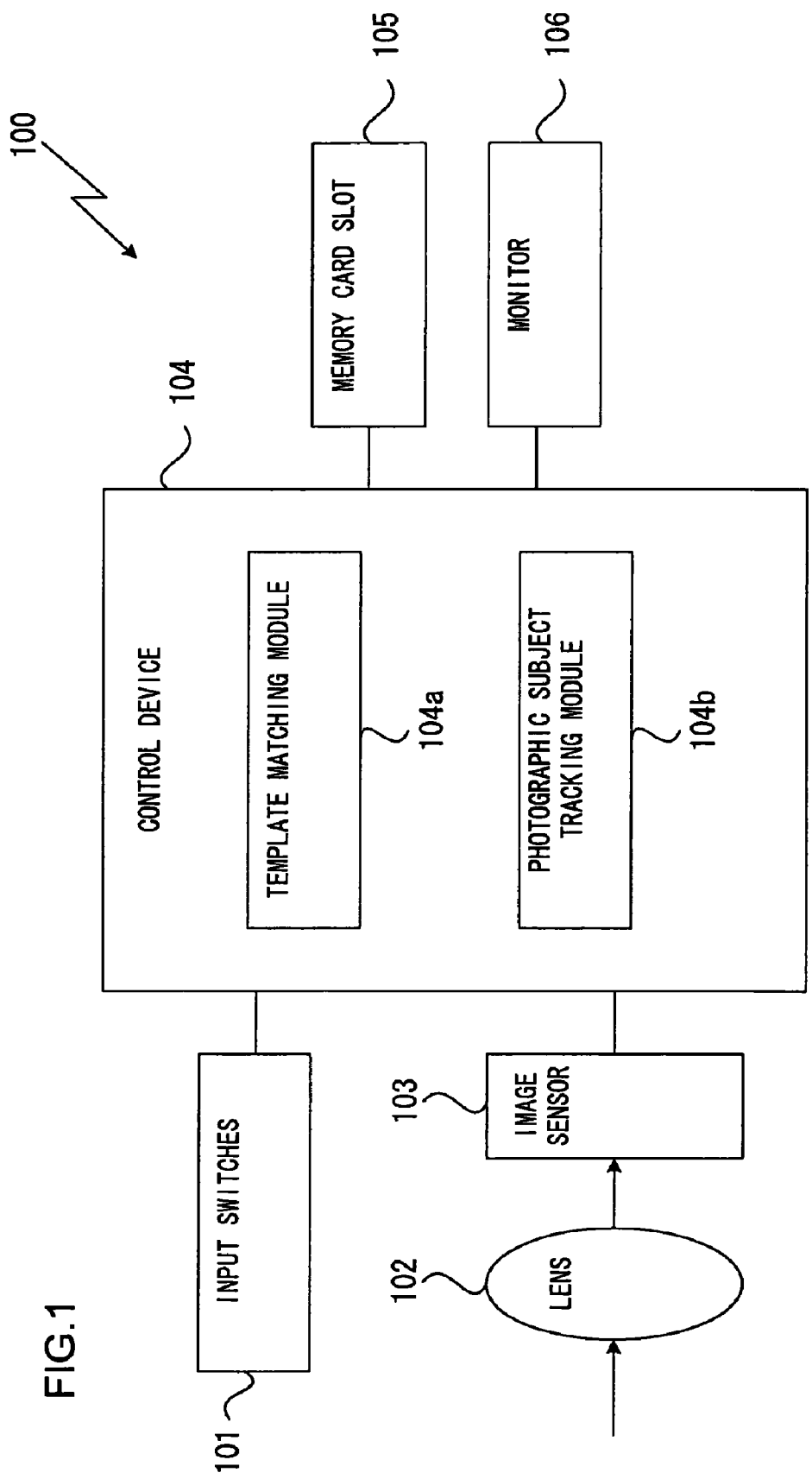
FIG. 1 is a block diagram showing the structure of a first embodiment, in which a camera is used as a photographic subject tracking device.

FIG. 1 is a block diagram showing the structure of a first embodiment, when a camera is used as a photographic subject tracking device. The camera 100 includes input switches 101, a lens 102, an image sensor 103, a control device 104, a memory card slot 105, and a monitor 106.

The input switches 101 include various input members that are actuated by the user. For example, a release switch and various actuation buttons for actuating the digital camera 100 may be included in these input switches 101.

The lens 102 consists of a plurality of groups of optical lenses, but only one lens is shown in FIG. 1, as a representative thereof. For example, a CCD or a CMOS may be used as the image sensor 103, and this captures an image of a photographic subject inputted via the lens 102 and outputs the image data that has been obtained by image capture to the control device 104. It should be understood that, with this camera 100 according to the first embodiment, the image sensor 103 performs capture of an image of the photographic subject upon depression by the user of the release button that is included in the input switches 101. At this time, a still image consisting of one frame may be captured at the time point that the release button is depressed; or, alternatively, a moving image of the photographic subject may be photographed by capturing a plurality of frames in succession at predetermined intervals, from when the release button is depressed until the release button is depressed again.

The control device 104 includes a CPU, a memory, and other peripheral circuitry, outputs image data (still image data or moving image data) inputted from the image sensor 103 to a monitor 106 upon which the image data is displayed, and stores the image data upon a memory card that is inserted into a memory card slot 105.

The control device 104 includes a template matching module 104a and a photographic subject tracking module 104b functionally. And, due to processing executed by these modules, when data for a moving image has been inputted from the image sensor 103, it is possible to track between frames a photographic subject that is present in the images of several frames that constitute this moving image data. The result of this tracking is used in processing for which tracking the photographic subject between frames is necessary, for example in processing for implementing an automatic focus adjustment function (AF function) or an automatic exposure adjustment function (AE function) with which the camera 100 is endowed. In the following, this processing for photographic subject tracking between frames when moving image data has been inputted from the image sensor 103 will be explained.

The template matching module 104a performs matching calculation between a plurality of template images that constitute references for template matching processing, and each frame of image data (i.e. each target image) inputted from the image sensor 103 in time series. Since the technique for this template matching is known, detailed explanation thereof will here be omitted, but, for example, the use of a technique such as a cross correlation method or a sequential similarity detection method or the like will be appropriate.

The template matching module 104a sets a rectangular frame upon the target image as a target region for performing matching with the template image, and, while shifting the position of this target region over the target image by a certain amount at a time, for example by one pixel at a time, calculates the similarity between the image in the target region and the template image at each position. And the template matching module 104a extracts, as the result of matching, the region (the matching region) for which the result of executing this template matching processing over the entire target image is that the similarity with the template image within the target image is the highest. And, on the basis of this matching result, the position of the photographic subject within the target image (i.e. the photographic subject position) is specified.

And, by tracking the photographic subject position specified by the template matching module 104a between frames, the photographic subject tracking module 104b tracks the photographic subject that is the tracking subject within the moving image data inputted from the image sensor 103.

Figure 2:
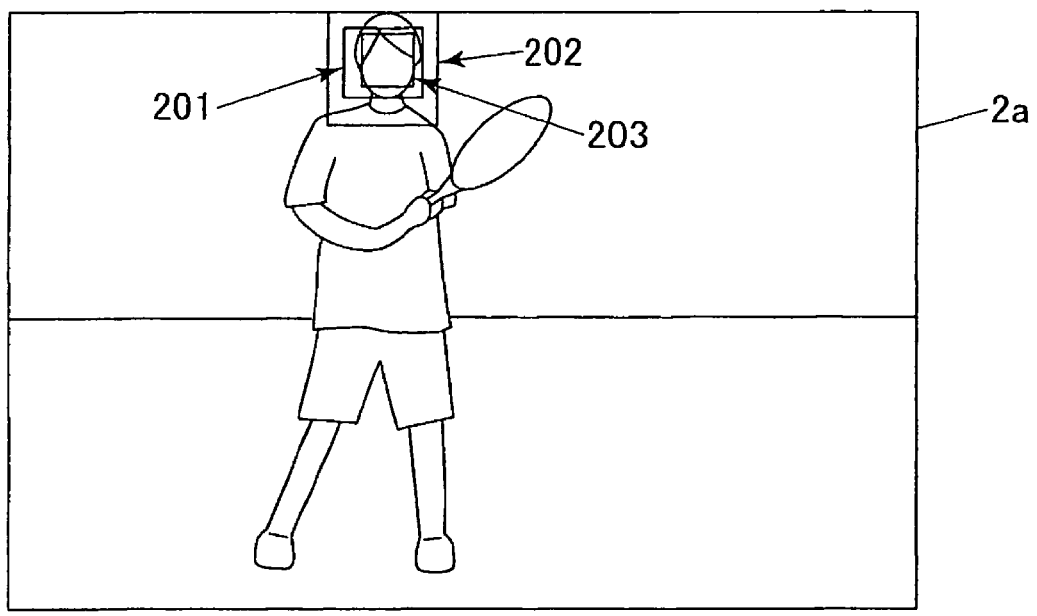
FIG. 2 is a figure showing a concrete example of a template image.

In the first embodiment, a plurality of template images are used for tracking a single photographic subject. This plurality of template images is prepared in advance by extracting them from among an image photographed by the user that includes the photographic subject that is to be taken as the tracking subject. For example, if the movement of the face of a person within the target image is to be tracked between frames, then, as shown in FIG. 2, the user photographs in advance an image 2a for template extraction that includes, as the photographic subject, the face of the person who is to be taken as being the subject of tracking.

And a rectangular frame 201 that includes the face of the person who is taken as the tracking subject is set within the image 2a for template extraction, and this is taken as the first template image (the template image 201). Furthermore, within the image 2a for template extraction, a rectangular frame 202 is set that includes this face of the person who is taken as the tracking subject and that is larger than the rectangular frame 201; for example, a rectangular frame 202 may be set whose area is twice that of the rectangular frame 201, and this is taken as the second template image (i.e. as a template image 202). Moreover, within the image 2a for template extraction, a rectangular frame 203 is set that includes the face of the person who is taken as the tracking subject and that is smaller than the rectangular frame 201; for example, a rectangular frame 203 may be set whose area is half that of the rectangular frame 201, and this is taken as the third template image (i.e. as a template image 203). At this time, the template images 201 through 203 are extracted over ranges that do not protrude over the edges of the image 2a for template extraction.

It should be understood that this extraction of the template images 201 through 203 from the image 2a for template extraction may be performed in advance by the user as a manual task, or may be performed automatically by the template matching module 104a when the image 2a for template extraction is read in.

When the input of moving image data is started, the template matching module 104a takes the image of each frame as a target image, and performs template matching by performing matching processing between this target image and the three template images 201 through 203. In other words, the template matching module 104a sets target regions within the target image of the same size as each of the template images, and performs template matching between each one of these template images and an image within the target region of the same size as that template image.

The template matching module 104a executes this template matching processing over the entire target image, and, as the results of matching, extracts within the target image the target region whose similarity with the template image 201 is the highest, the target region whose similarity with the template image 202 is the highest, and the target region whose similarity with the template image 202 is the highest. As a result, as for example shown in FIG. 3, the template matching module 104a extracts a matching region 301 as the result of matching with the template image 201. Moreover, it extracts a matching region 302 as the result of matching with the template image 202, and a matching region 303 as the result of matching with the template image 203.

And the template matching module 104*a* classifies the three matching regions that have thus been extracted as the results of matching against the three template images as regions that are used for specifying the position of the photographic subject during processing that will be described hereinafter (i.e. as a photographic subject position specification region), and as a region other than the above. In this embodiment, a case will be explained in which these three matching regions are classified on the basis of the distances between them.

In concrete terms, the template matching module 104*a* classifies those two matching regions, among the three matching regions that have been extracted as the result of matching against the three template images, for which the distance between them is the closest, as being the photographic subject position specification region. For example, in the example shown in FIG. 3, the matching region 302 and the matching region 303 the distance between which is the closest are classified as being the photographic subject position specification regions. By doing this, it is possible to set the matching regions 302 and 303 in which the face of the person who is the photographic subject to be tracked is captured as the photographic subject position specification regions, and it is possible to eliminate the matching region 301 that is displaced from the face of the person who is the photographic subject to be tracked, from the photographic subject position specification regions.

Figure 4:
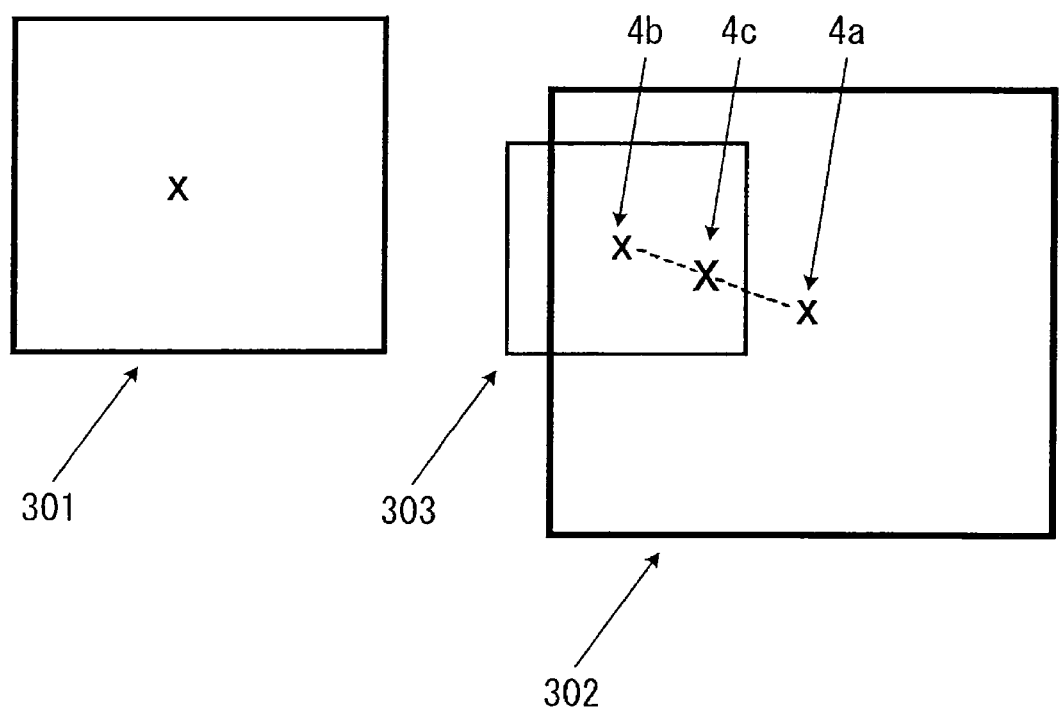
FIG. 4 is a figure showing a method of specifying the position of a photographic subject.

The template matching module 104*a* specifies the position of the photographic subject to be tracked within the target image 3*a*, in other words the photographic subject position, on the basis of the two matching regions that are employed as the photographic subject position specification regions. In concrete terms, as shown in FIG. 4, the template matching module 104*a* sets the center point 4*a* of the matching region 302 and the center point 4*b* of the matching region 303 as being representative points for respective matching regions that are employed as the photographic subject position specification regions, and specifies the position 4*c* of the barycenter between these two representative points as being the position of the photographic subject.

It should be understood that this method of specifying the position of the photographic subject is only cited by way of example; the template matching module 104*a* could also specify the position of the photographic subject by some other method. For example, it would also be acceptable to arrange to specify the center point of the straight line that joins the upper left points, or the lower left points, or the upper right points, or the lower right points of the matching region 302 and the matching region 303, as being the position of the photographic subject. Moreover, it would also be acceptable to arrange to specify, as the position of the photographic subject, not the position 4*c* of the barycenter, but rather a certain region centered around this barycenter position 4*c*.

Figure 5:
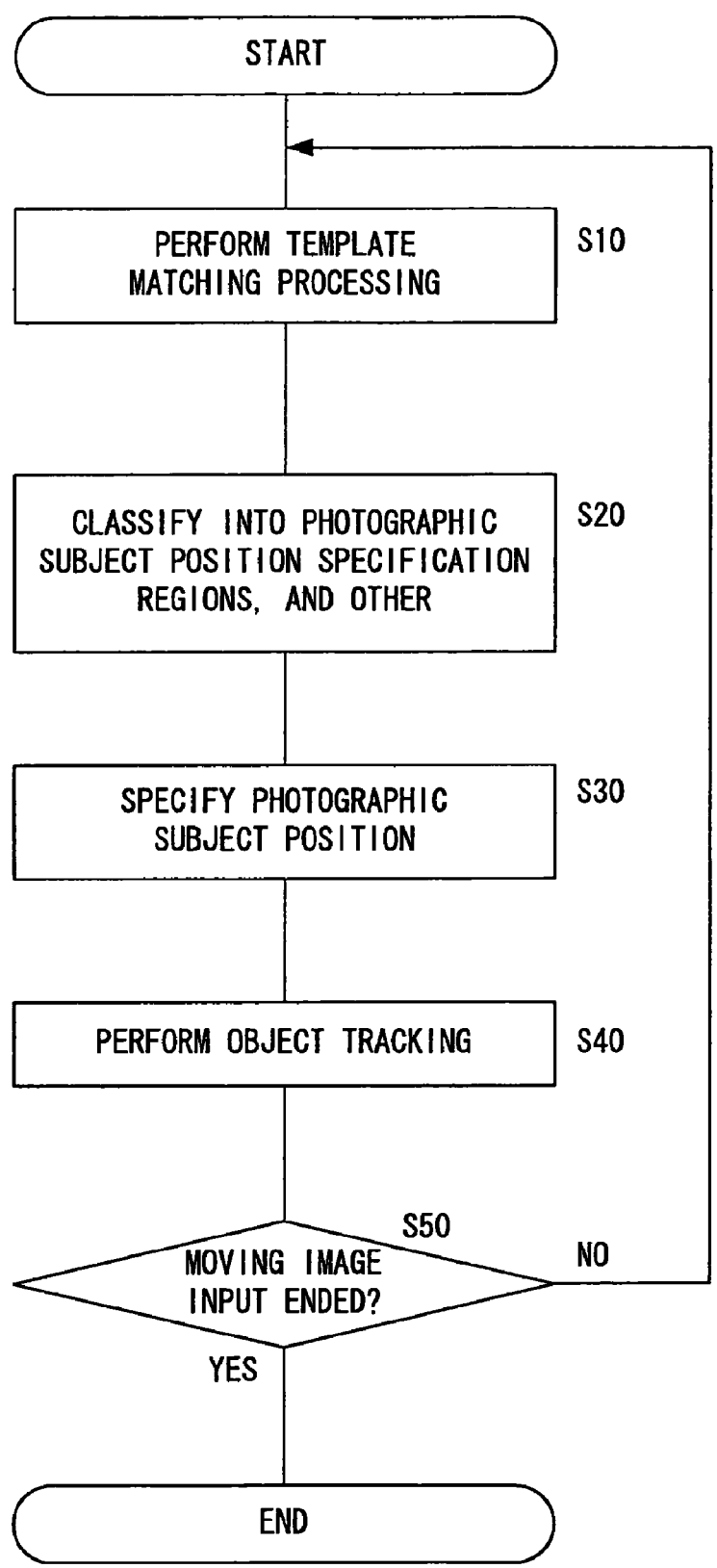
FIG. 5 is a flow chart showing processing performed by a camera 100, in this first embodiment.

FIG. 5 is a flow chart showing processing performed by the camera 100 of this first embodiment. When an input switch 101 is actuated by the user and photography of a moving image is started, the processing in FIG. 5 is executed by starting a photographic subject tracking program that is stored in the memory of the control device 104.

In a step S10, the template matching module 104*a* performs matching processing, as described above, between each of the three template images and target regions that have been set within the target image 3*a*, and obtains a matching result for each of the template images. Then the flow of control proceeds to a step S20, in which the matching regions are classified into regions for specifying the photographic subject and an other region by, among these three matching regions that have been extracted as the results of matching for three templates, taking those two matching regions for which the distance between them is closest as being the photographic subject position specification regions. Then the flow of control proceeds to a step S30.

In this step S30, the template matching module 104*a* specifies the position of the photographic subject to be tracked within the target image 3*a*, in other words the photographic subject position, on the basis of the two matching regions that, as described above, are used as photographic subject position specification regions. Then the flow of control proceeds to a step S40, in which the photographic subject tracking module 104*b* tracks the photographic subject position within the target image 3*a* that has been specified by the template matching module 104*a* between frames, and thereby tracks the photographic subject to be tracked within the moving image data inputted from the image sensor 103; and then the flow of control proceeds to a step S50.

In this step S50, a decision is made as to whether or not the input of moving image data from the image sensor 103 has ended. If it has been decided that the input of moving image data has not ended, then the flow of control returns to the step S10 and the above processing is repeated. But if it is decided that the input of moving image data has ended, then this processing sequence terminates.

According to the first embodiment as explained above, the following advantageous effects may be obtained.

(1) The template matching module 104*a* performs template matching by using a plurality of template images of different sizes, and extracts matching regions for each of the templates within the imputed image. And, on the basis of the distances between these matching regions, it is arranged for the template matching module 104*a* to classify the matching regions that have been extracted into photographic subject position specification regions and an other region, and then to specify the position of the photographic subject within the inputted image on the basis of the positions of the photographic subject position specification regions within the inputted image. And it is arranged for the photographic subject tracking module 104*b* to track the movement of the photographic subject between frames by tracking the position of the photographic subject that has thus been specified between frames. Due to this, it is possible to specify the position of the photographic subject by extracting, from among the results of matching the plurality of templates, only those matching regions that are used for specifying the position of the photographic subject, so that it is possible to specify the position of the photographic subject with high accuracy. Accordingly, it is possible to perform tracking of the photographic subject with high accuracy.

(2) It is arranged to specify the position of the barycenter between representative points of the photographic subject position specification regions as the photographic subject position within the inputted image. Due to this, it is possible to specify the photographic subject position with a simple calculation.

Second Embodiment

Figure 3:
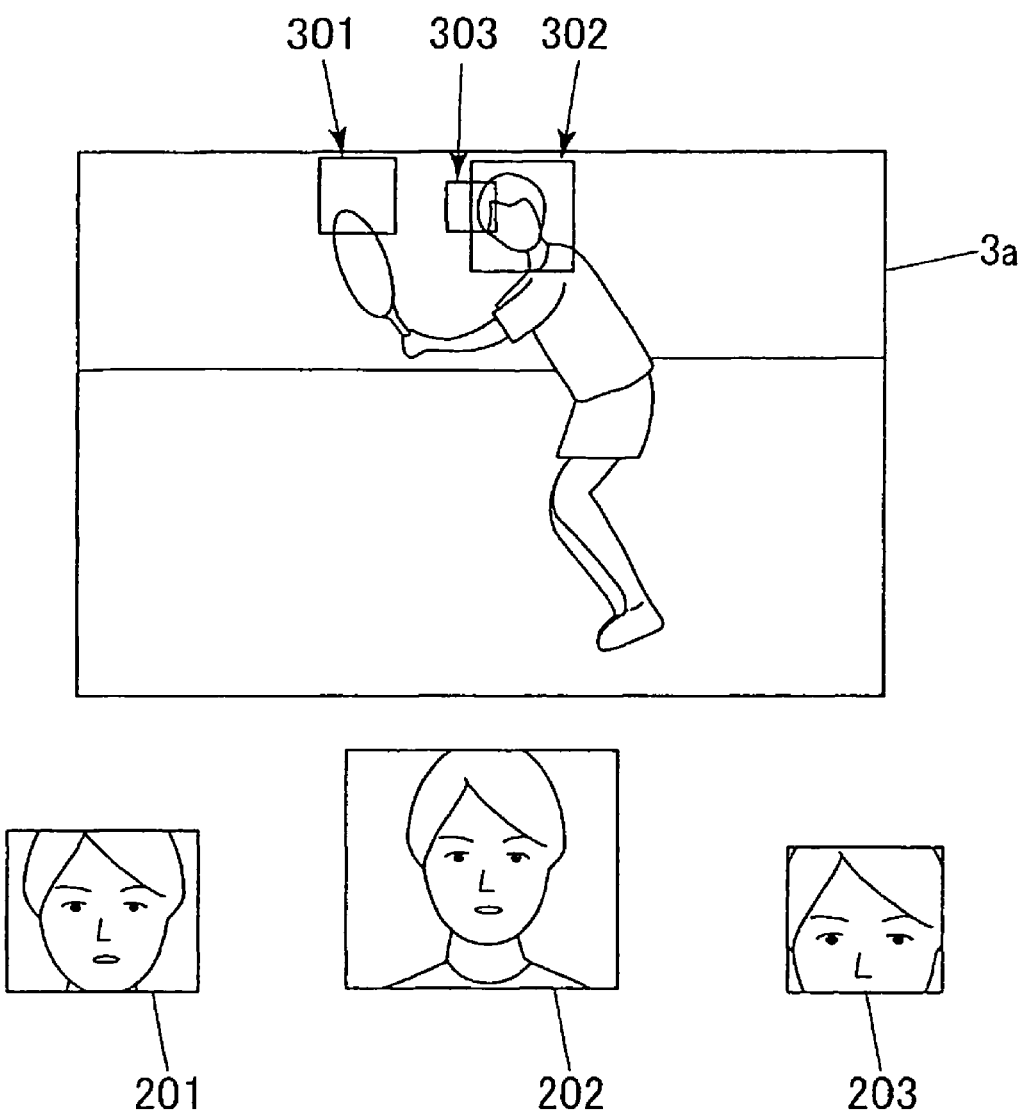
FIG. 3 is a figure showing a concrete example of a matching result in the interior of a template image.

In a second embodiment, a case will be explained in which the photographic subject to be tracked is tracked within the moving image data inputted from the image sensor 103, while updating each of template images 201 through 203 as described above with respect to the first embodiment. It should be understood that explanation relating to FIGS. 2 through 4 is omitted, since it would be similar to that for the first embodiment.

When performing matching processing using template images, and tracking a photographic subject to be tracked that is included in moving image data, if the photographic subject to be tracked is moving, the shape of the photographic subject changes between frames. Due to this, if template images that have been prepared in advance are used continuously, then the similarity between each of the template images and the image within the target region gradually decreases along with change in the shape of the photographic subject. And the possibility that the accuracy of tracking of the photographic subject by the photographic subject tracking module 104*b* gradually decreases together with this is high. Accordingly, in this second embodiment, the accuracy of the template matching is enhanced by sequentially updating the template images according to the movement of the photographic subject, so that it becomes possible to perform object tracking at high accuracy, even if the shape of the photographic subject changes from one moment to the next.

Figure 6:
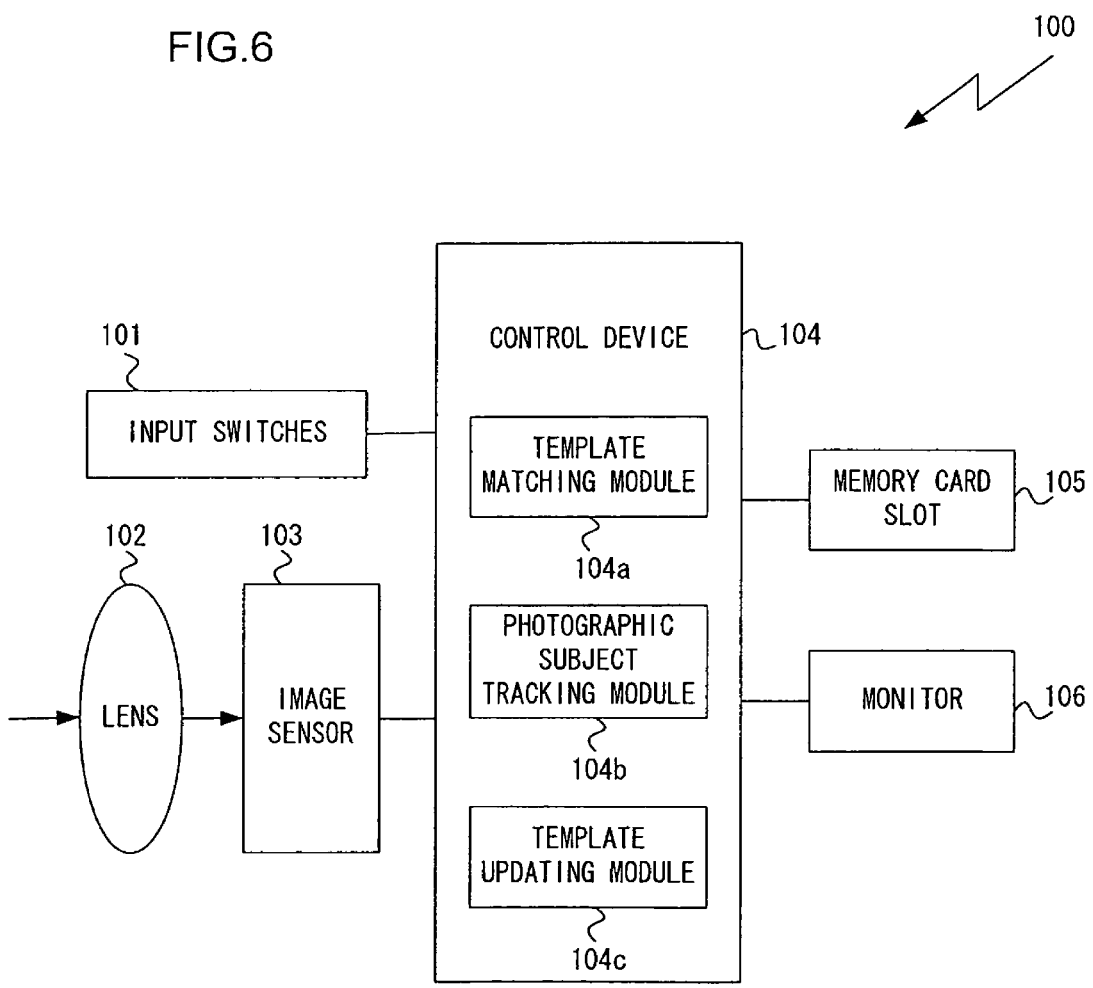
FIG. 6 is a block diagram showing the structure of a second embodiment, in which a camera is used as a photographic subject tracking device.

FIG. 6 is a block diagram showing the structure of an embodiment in which a camera is used as the photographic subject tracking device of the second embodiment. It should be understood that, in FIG. 6, to structural elements that are the same as those in the block diagram shown in FIG. 1 for the first embodiment, the same reference symbols are appended, and the explanation will center upon the points of difference.

The control device 104 further includes a template updating module 104*c*. As will be described hereinafter, if the template images used in the template matching satisfy certain updating conditions, then this template updating module 104*c* replaces and updates these template images. In this embodiment, for each of the three template images 201 through 203 that are of different sizes as described above in connection with the first embodiment, a plurality of images are prepared of the photographic subject that is to be the object of tracking, photographed at different time instants, and these images are used as the template images.

In other words, as shown in FIG. 2, a rectangular frame 201 including the face of the person who is to be the subject of tracking is set within an image 2*a* for template extraction, and this is taken as being one of the template images 201. Furthermore, a rectangular frame 201 including the face of the person who is to be the subject of tracking is set within an image 2*a* for template extraction that has been photographed at a different time, and this is also taken as being one of the template images 201. In this manner, by acquiring a plurality of images 2*a* for template extraction that have been photographed at different times, and by extracting a template image 201 from each of these images 2*a* for template extraction, it is possible to prepare a plurality of template images 201, each of which has been photographed at a different time. In a similar manner, a plurality of template images (i.e. template images for updating) that have been photographed at different times are prepared as the template images 202 and 203 as well.

In this embodiment, a case in which four images are used as the template images 201 through 203, each of which has been photographed at a different time, and, in order to distinguish these template images from one another, the following names (A) through (D) will be appended to them. It should be understood that this (A) through (D) are explained for the template images 201, as a representative example.

(A) INITIAL

Among the four template images 201, the template image 201 extracted from the image 2*a* for template extraction that was photographed the earliest in time is termed "INITIAL".

(B) OLD

Among the four template images 201, the template image 201 extracted from the image 2*a* for template extraction that was photographed the second in time sequence, is termed "OLD".

(C) CURRENT

Among the four template images 201, the template image 201 extracted from the image 2*a* for template extraction that was photographed the third in time sequence, is termed "CURRENT".

(D) NEW

Among the four template images 201, the template image 201 extracted from the image 2*a* for template extraction that was photographed the fourth in time sequence, in other words the template image extracted from the image 2*a* for template extraction that was photographed the most recently in time, is termed "NEW".

In a similar manner, respective "INITIAL", "OLD", "CURRENT", and "NEW" template images are prepared for the plurality of template images 202 and the plurality of template images 203. It should be understood that "INITIAL", "OLD", "CURRENT", and "NEW" are titles that are attributed for the purposes of convenience for making clear the subjects of performing updating in template updating processing by the template updating module 104*c*, as will be described hereinafter, and are not to be considered as necessarily being limitative of the titles of these template images.

Figure 7:
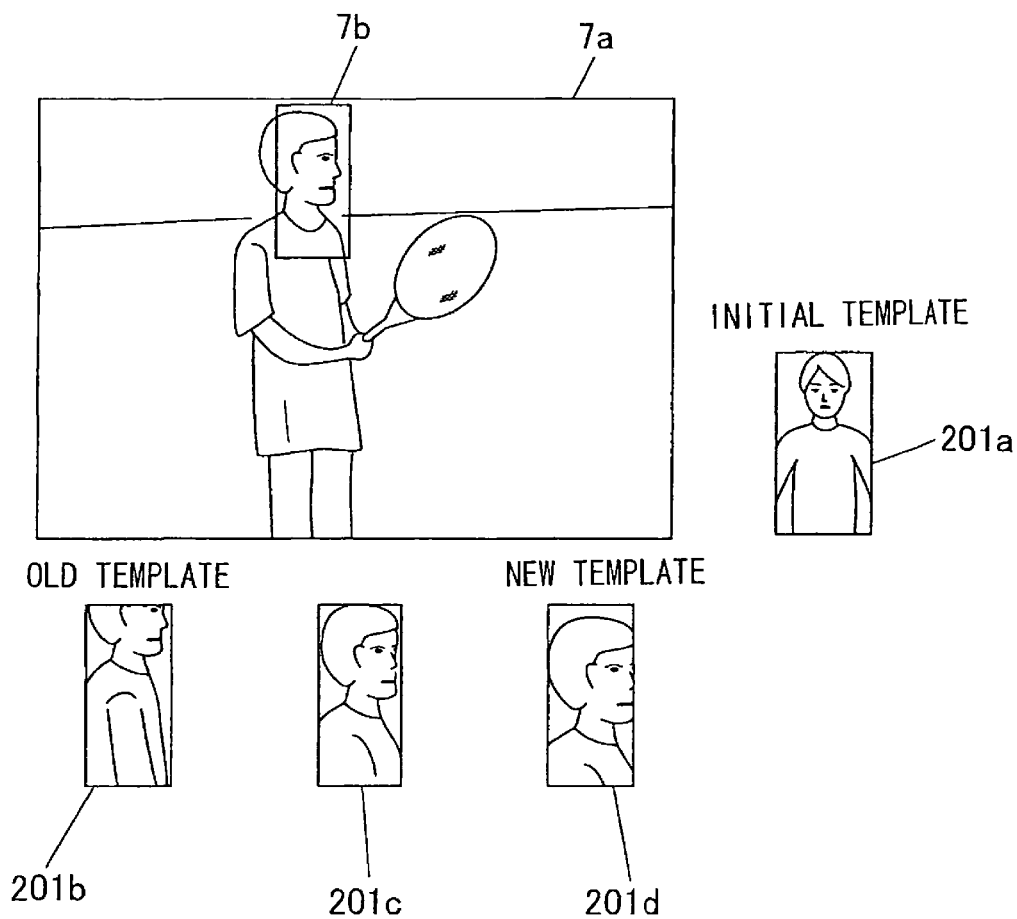
FIG. 7 is a figure showing concrete examples of a target image and a template image, in this second embodiment.

FIG. 7 shows a concrete example of a target image and template images 201 in this second embodiment. It should be understood that although, in the following explanation, the template images 201 are explained as representatives, there is no difference for the template images 202 and 203, except for the fact that the sizes of the images are different from that of the template images 201; there is no difference with regard to the types of the templates, the contents of the matching processing, the contents of the updating processing, and so on.

As shown in FIG. 7, when tracking the movement of a person within the target image 7*a* between frames, the user prepares in advance four images 2*a* for template extraction in which the person who is to be the photographic subject has been photographed at different time instants, and, using these, template images 201*a* through 201*d* that have been photographed at different time instants are prepared. At this time, among these template images 201*a* through 201*d*, that template image 201*a* that was photographed at the earliest time instant is set as "INITIAL", the template image 201*b* that was photographed at the next earliest time instant after that is set as "OLD", the template image 201*c* that was photographed at the next earliest time instant after that is set as "CURRENT", and the template image 201*d* that was photographed at the latest time instant is set as "NEW".

If it is not possible to prepare in advance four images 2*a* for template extraction in which the photographic subject is photographed at different time instants, then it would be acceptable to arrange to create a plurality of pseudo-template images 201*a* through 201*d* from one image 2*a* for template extraction in which the photographic subject is photographed. For example, a plurality of pseudo-template images 201*a* through 201*d* may be generated by magnifying or shrinking down a single image 2*a* for template extraction; or it would also be acceptable to arrange to generate a plurality of pseudo-template images 201*a* through 201*d* by changing the density of the single image 2*a* for template extraction.

When generating a plurality of pseudo-template images 201*a* through 201*d* by magnifying or shrinking a single image 2*a* for template extraction, a template image that has been extracted from the image 2*a* for template extraction is taken as being "INITIAL" 201a, and then "OLD" 201b is extracted from an image that has been produced by magnifying or shrinking down this image 2a for template extraction by some magnification. Furthermore, "CURRENT" 201c may be extracted from an image that has been produced by magnifying or shrinking down the image 2a for template extraction by a different magnification from that used when extracting "OLD" 201b, and "NEW" 201d may be extracted from an image that has been produced by magnifying or shrinking down by a yet different magnification.

Moreover, when generating a plurality of pseudo-template images 201a through 201d by changing the density of a single image 2a for template extraction, a plurality of pseudo-template images 201a through 201d each having a different density (i.e. brightness) may be generated by taking a template image that has been extracted from the image 2a for template extraction as being "INITIAL" 201a and taking images that have been made by brightening or darkening "INITIAL" as being "OLD" 201b, "CURRENT" 201c, and "NEW" 201d.

In a similar manner to the first embodiment, when the input of moving image data from the image sensor 103 is started, the template matching module 104a takes the image of each frame as a target image 7a, and performs matching processing between this target image 7a and the template images 201 through 203. At this time, as shown in FIG. 7, the template matching module 104a performs matching processing between a target region 7b that has been set within the target image 7a, and the four template images "INITIAL" 201a, "OLD" 201b, "CURRENT" 201c, and "NEW" 201d.

In a similar manner, when performing matching processing using the template images 202, matching processing is performed between a target region that is set within the target image 7a, and the four template images "INITIAL" 202a, "OLD" 202b, "CURRENT" 202c, and "NEW" 202d. Moreover, when performing matching processing using the template images 203, matching processing is performed between a target region that is set within the target image 7a, and the four template images "INITIAL" 203a, "OLD" 203b, "CURRENT" 203c, and "NEW" 203d. In other words, in this second embodiment, the template matching module 104a performs matching processing using a total of twelve template images.

The template matching module 104a executes this template matching processing over the entire target image 7a, and, as a result, extracts within the target image 7a the target region whose similarity with "INITIAL" 201a is the highest, the target region whose similarity with "OLD" 201b is the highest, the target region whose similarity with "CURRENT" 201c is the highest, and the target region whose similarity with "NEW" 201d is the highest. And, as the result of matching, the template matching module 104a selects the group among these of that template image and that target region whose similarity is the highest, and takes the template image that has thus been selected as being the selected template image, and the target region that has been selected as being the matching region.

The template matching module 104a then performs this processing for the template images 202a through 202d and for the template images 203a through 203d, and obtains results of matching for the template images 202 and results of matching for the template images 203. And, in a similar manner to the case with the first embodiment, among the three matching regions that have been selected as the results of matching the three template images, the template matching module 104a takes the more than half matching regions, in other words the two matching regions, between which the distance is the closest, as being the photographic subject position specification regions.

And, in a similar manner to the case with the first embodiment, the template matching module 104a specifies the position of the photographic subject to be tracked within the target image 7a, in other words the photographic subject position, on the basis of the two matching regions that have been employed as the photographic subject position specification regions. And the photographic subject tracking module 104b tracks the photographic subject to be tracked within the moving image data inputted from the image sensor 103, by tracking this photographic subject position that has been specified by the template matching module 104a between frames.

The template updating module 104c updates at least one of the template images "OLD", "CURRENT", and "NEW" on the basis of the template matching processing by the template matching module 104a. It should be understood that "INITIAL" is excepted from being a subject for being updated. In other words, the template updating module 104c deals with "INITIAL" as being a permanent template image upon which updating is not to be performed (in other words, as a non-updated template image).

In the following, an example will be explained in which the template updating module 104c updates "OLD" 201b, "CURRENT" 201c, and "NEW" 201d. It should be understood that the processing for updating "OLD" 202b, "CURRENT" 202c, and "NEW" 202d of the template images 202, and the processing for updating "OLD" 203b, "CURRENT" 203c, and "NEW" 203d of the template images 203, are the same as in the case of the template images 201 explained below.

As described above, although an image that has been photographed in advance or a pseudo-template image that has been created is set for each of the template images "OLD" 201b, "CURRENT" 201c, and "NEW" 201d when starting processing, this image is sequentially updated by being replaced by a template image as shown in (A) through (C) below, by template update processing being executed by the template updating module 104c.

(A) "CURRENT" 201c (The Current Template Image)

The selected template image that was selected as the result of matching for the template image 201 during the most recent template update is set as "CURRENT" 201c.

(B) "OLD" 201b (The Old Selected Template Image)

The template image that was set as "CURRENT" 201c until the "CURRENT" 201c of (A) was set during the most recent template update is set as "OLD" 201b. In other words, the "CURRENT" 201c one generation before is set as "OLD" 201b.

(C) "NEW" 201d (The New Template Image)

The image within the target region for which, during the most recent template update, it was decided that the similarity with the template image that was set as "CURRENT" 201c was the highest in the target image 7a, is set as "NEW" 201d; in other words, the image within the matching region that was selected as the matching result for the template image 201 is extracted and set.

The template updating module 104c takes the images that agree with the conditions (A) through (C) as updated template images, only if the result of the template matching processing performed by the template matching module 104a is that certain update conditions are satisfied. In concrete terms, as explained in (a) through (d) below, it performs update processing of the template images according to the results of matching processing by deciding whether or not the results of matching processing by the template matching module 104*a* satisfy these update conditions.

(a) Processing when the result of template matching processing by the template matching module 104*a* is that "INITIAL" 201*a* has been selected as the selected template image In this case, the template updating module 104*c* decides whether or not the updating condition is satisfied that, some predetermined number of times or more before in succession, for example seven times before or more, "INITIAL" 201*a* has been selected as the selected template image, and moreover the average of similarity during this situation is greater than or equal to some predetermined similarity, for example is greater than or equal to 0.8, if the similarity that denotes absolute agreement is 1 and the similarity that denotes complete disagreement is 0. And, if it has been decided that the above described update condition is not satisfied, then the template updating module 104*c* does not update the template images, but keeps the settings of the template images "OLD" 201*b*, "CURRENT" 201*c*, and "NEW" 201*d*.

By contrast, if it has been decided that the above described update condition is satisfied, then the template images are updated in the following manner. That is, the template image that up until now was set to "CURRENT" 201*c* is set to "OLD" 201*b*, and the template image that up until now was set to "INITIAL" 201*a* is set to "CURRENT" 201*c*. Due to this, the selected template image is set to "CURRENT" 201*c*, and the "CURRENT" 201*c* one generation before can be set to "OLD" 201*b*. Moreover, the template updating module 104*c* takes in the image in the matching region that has been selected as the result of matching the template images 201, and newly sets it to "NEW" 201*d*.

(b) Processing when the result of template matching processing by the template matching module 104*a* is that "CURRENT" 201*c* has been selected as the selected template image In this case, the template updating module 104*c* does not perform updating of the template images, but keeps the settings of the template images "OLD" 201*b*, "CURRENT" 201*c*, and "NEW" 201*d* as they are. In other words, since it is decided that the template image that was decided to have the highest similarity during previous template updating is also the one whose similarity is the highest this time, accordingly it is decided that there is no need to update the template images because the amount of movement of the photographic subject is small, and thus updating of the template images is not performed.

(c) Processing when the result of template matching processing by the template matching module 104*a* is that "OLD" 201*c* has been selected as the selected template image In this case, the template updating module 104*c* decides whether or not the updating condition is satisfied that, some predetermined number of times or more before in succession, for example seven times before or more, "OLD" 201*c* has been selected as the selected template image, and moreover the average of similarity between these is greater than or equal to some predetermined similarity, for example is greater than or equal to 0.8. And, if it is decided that the update condition described above is not satisfied, then the template updating module 104*c* does not perform updating of the template images, but keeps the settings of the template images "OLD" 201*b*, "CURRENT" 201*c*, and "NEW" 201*d* as they are.

By contrast, if it has been decided that the above described update condition is satisfied, then the template updating module 104*c* updates the template images in the following manner. That is, the template image that up until now was set to "OLD" 201*b* is set to "CURRENT" 201*c*, and the template image that up until now was set to "CURRENT" 201*c* is set to "OLD" 201*b*. Due to this, the selected template image is set to "CURRENT" 201*c*, and the "CURRENT" 201*c* one generation before is set to "OLD" 201*b*. Moreover, the template updating module 104*c* takes in the image in the matching region that has been selected as the result of matching the template images 201, and newly sets it to "NEW" 201*d*.

(d) Processing when the result of template matching processing by the template matching module 104*a* is that "NEW" 201*d* has been selected as the selected template image In this case, the template updating module 104*c* decides whether or not the updating condition is satisfied that, some predetermined number of times or more before in succession, for example seven times before or more, "NEW" 201*d* has been selected as the selected template image, and moreover the average of similarity between these is greater than or equal to some predetermined similarity, for example is greater than or equal to 0.8. And, if it is decided that the update condition described above is not satisfied, then the template updating module 104*c* does not perform updating of the template images, but keeps the settings of the template images "OLD" 201*b*, "CURRENT" 201*c*, and "NEW" 201*d* as they are.

By contrast, if it has been decided that the above described update condition is satisfied, then the template updating module 104*c* updates the template images in the following manner. That is, the template image that up until now was set to "NEW" 201*d* is set to "CURRENT" 201*c*, and the template image that up until now was set to "CURRENT" 201*c* is set to "OLD" 201*b*. Due to this, the selected template image is set to "CURRENT" 201*c*, and the "CURRENT" 201*c* one generation before can be set to "OLD" 201*b*. Moreover, the template updating module 104*c* takes in the image in the matching region that has been selected as the result of matching the template images 201, and newly sets it to "NEW" 201*d*.

By updating the template images in this manner, it is possible to perform template matching processing at high accuracy, corresponding to change in the shape of the photographic subject according to movement of the photographic subject. Moreover, since it is arranged to perform updating of the template images, only if for a predetermined number of times in succession "INITIAL" 201*a*, "OLD" 201*b*, or "NEW" 201*d* has been selected as the selected template image, and moreover the average of similarity during this situation is greater than or equal to some predetermined similarity, accordingly it is possible to perform the template matching processing in a stabilized manner while keeping the frequency at which the template images are updated low, as compared to prior art techniques for performing updating of the template images frame by frame.

For example, when updating a moving image that consists of 600 still image frames, while updating of the template images according to a prior art technique took place 600 times, by contrast, by utilizing the technique of this embodiment, it is possible to reduce the processing load by making it possible to reduce the number of times that the template images are updated to around thirty times.

Figure 8:
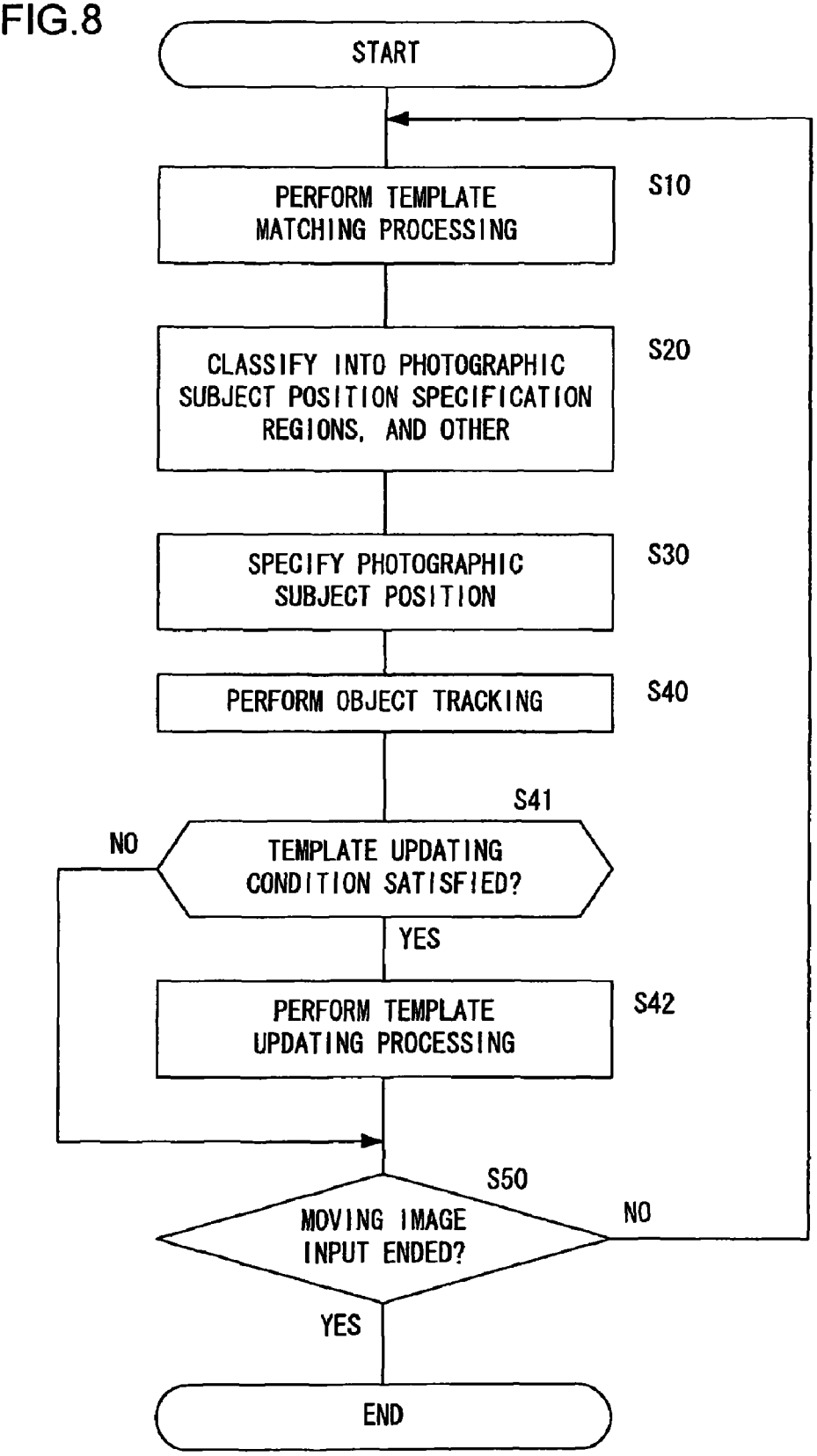
FIG. 8 is a flow chart showing processing performed by a camera 100, in this second embodiment.

FIG. 8 is a flow chart showing the processing performed by the camera 100 in this second embodiment. The processing shown in FIG. 8 is executed by the control device 104 starting the photographic subject tracking program that is stored in the memory when photography of a moving image is started due to the user actuating the input switches 101. It should be understood that, to steps in FIG. 8 that are the same as steps in FIG. 5 described above, the same step numbers are appended, and explanation thereof will be omitted, with the explanation focusing upon the points of difference.

In a step S41, the template updating module 104c decides whether or not that the result of matching processing by the template matching module 104a satisfies conditions for updating as shown in (a) through (d). If it has been decided that no condition for updating is satisfied, then the flow of control is transferred to the step S50. But if it has been decided that some condition for updating is satisfied, then the flow of control proceeds to a step S42. In this step S42, the template updating module 104c performs updating processing of the template images according to the results of the matching processing by the template matching module 104, as described in (a) through (d) above, and then the flow of control proceeds to the step S50.

According to the second embodiment as explained above, in additional to the advantageous effects with the first embodiment, the following advantageous effects may be obtained.

(1) It is arranged to prepare a plurality of images that have been photographed at different times as the template images 201 through 203, and to update these template images according to the results of template matching. Due to this, it is possible to perform high accuracy template matching processing in correspondence to changes in the shape of the photographic subject caused by the photographic subject moving.

(2) Among this plurality of template images, it is arranged not to update "INITIAL", but to keep it as a permanent template. Due to this, it is possible to prevent the accumulation of information errors that tend to occur due to the dynamic template image updating processing.

(3) When performing the updating of the template images, it is arranged to perform updating of the template images only if "INITIAL", "OLD", or "NEW" has been selected as the selected template image for a predetermined number of times or more in succession, and moreover if the average of similarity during this situation is greater than or equal to a predetermined similarity. Due to this, it is possible to perform the template matching processing in a stabilized manner by reducing the frequency of updating of the template images, as compared with a prior art technique in which, for example, the updating of the template images is performed for each frame.

(4) If it is not possible to prepare in advance, as "INITIAL", "OLD", "CURRENT", and "NEW", a plurality of template images in which the photographic subject has been photographed at different time instants, then it is arranged to create a plurality of pseudo-template images using a single image 2a for template extraction. By doing this, it is possible to perform tracking of the photographic subject by performing the template matching processing of the present invention, even if it is not possible to prepare a plurality of template images in which the photographic subject has been photographed at different time instants.

Variant Embodiments

It should be understood that the photographic subject tracking devices according to the embodiments described above may also be varied in the following ways.

(1) In the first embodiment described above, a case was explained in which the photographic subject was tracked by using the three template images 201 through 203. However, it would also be acceptable to use four or more template images.

In this case, the processing performed by the template matching module 104a would take place as follows.

The template matching module 104a classifies the plurality of matching regions that have been extracted as the result of the matching processing into matching regions that are to be taken as photographic subject position specification regions, and matching regions other than those, according to the closeness of the distances between those regions within the target image. For example, the distance between two of the matching regions may be calculated over the plurality of matching regions. And a group of matching regions is extracted for which the distances that have been calculated are short, and these are taken as being the photographic subject position specification regions. For example, the template matching module 104a may extract a number m of matching regions as photographic subject position specification regions.

It should be understood that, for example, m may be calculated according to the following Equation (1); in Equation (1) below, "floor" is the function of truncating the decimal point and the following digits, and n is the number of template images that are used for the matching:

$$m = \text{floor}(n/2) + 1 \quad (1)$$

For example, if six template images are used, finally four matching regions are extracted. And the template matching module 104a sets a representative point in each of the m matching regions that have been extracted, and specifies the position of the barycenter between these representative points as being the position of the photographic subject to be tracked (i.e. the photographic subject position). It should be understood that the representative points may be, for example, the centers in the matching regions.

(2) In the first and the second embodiments described above, examples were explained in which, as subject data for the template matching and photographic subject tracking, processing was performed upon the moving image data inputted from the image sensor 103, in other words upon image data of a plurality of frames inputted in time series. However, the present invention is not limited to this case; if still images of a plurality of frames are inputted in time series by a sequential shooting function, then the present invention may also be applied to the case of tracking a photographic subject over these frames.

(3) In the second embodiment described above, an example was explained in which four template images "INITIAL", "OLD", "CURRENT", and "NEW" were used for each of the template images 201, 202, and 203. However the present invention is not to be considered as being limited by this feature; it would also be acceptable to arrange to use five or more template images for each of the template images 201, 202, and 203. In this case, it would be acceptable to increase the number of "OLD"s, and to use the "CURRENT" for a plurality of generations before as a template image.

(4) In the second embodiment described above, an example was explained in which, as the condition for updating the template images, the template updating module 104c decided whether or not some predetermined number of times or more before in succession, for example seven times before or more, "INITIAL", "OLD", or "NEW" had been selected as the selected template image, and moreover the average of similarity during this situation was greater than or equal to some predetermined similarity, for example was greater than or equal to 0.8. However the present invention is not to be considered as being limited by this feature; it would also be acceptable to arrange to decide whether or not some predetermined number of times or more before in succession "INITIAL", "OLD", or "NEW" has been selected as the selected template image, and moreover all of the similarity during this situation are greater than or equal to some predetermined similarity. Moreover, the template updating module 104c may perform updating of the template images by taking, as the updating condition, only that "INITIAL", "OLD", or "NEW" has been selected as the selected template image some predetermined number of times or more before in succession.

(5) In the second embodiment described above, an example was explained in which, if it was decided that a condition for updating the template images was satisfied, the template updating module 104c updated the template images by interchanging "CURRENT" and "OLD" or "NEW", according to this condition. However the present invention is not to be considered as being limited by this feature; it would also be acceptable to arrange to update the template images by overwriting, with the template images after updating, only pixels corresponding to a predetermined proportion of the pixels corresponding to the template images before updating. For example, it would be acceptable to arrange to update the template images by, instead of setting the template image that was set up until now as "OLD" to "CURRENT", rather adding together m % of all the pixels of "CURRENT" and (100-m) % of all of the pixels of "OLD".

(6) In the first and second embodiments described above, examples were explained in which a camera 100 was used as the photographic subject tracking device, and the photographic subject tracking program was executed by a control device 104 that was provided to this camera 100. However, it would also be acceptable to arrange to use some other type of device as the photographic subject tracking device. For example, it would also be acceptable to utilize a personal computer as the photographic subject tracking device, in which case the photographic subject tracking program would be recorded upon a recording medium that is provided to the personal computer, such as upon a hard disk drive or the like, and the CPU of the computer would read in this photographic subject tracking program into the memory and execute it. Moreover, it would also be acceptable to utilize a security device (i.e. a monitoring device) that monitors the interior of some facility, as the photographic subject tracking device.

Figure 9:
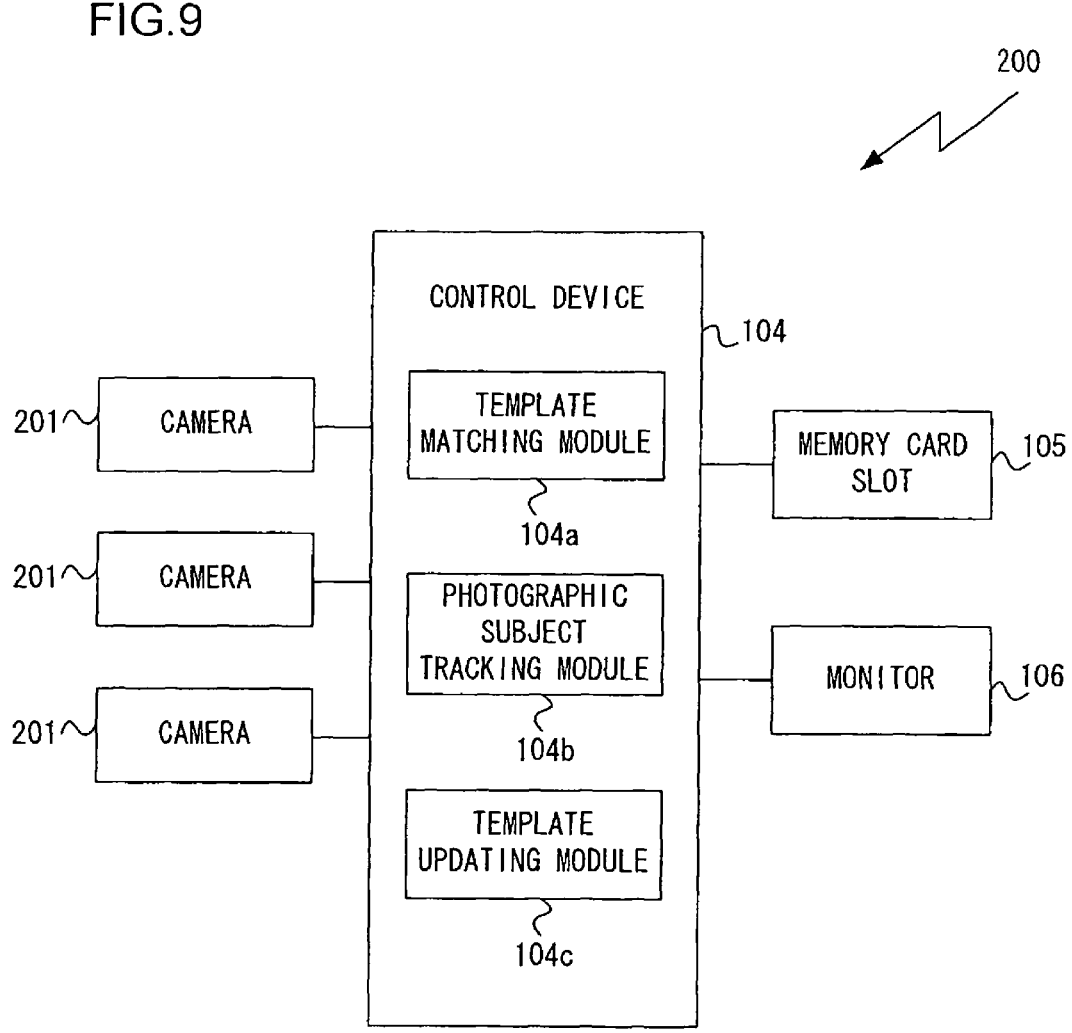
FIG. 9 is a block diagram showing the structure of an embodiment, when a security device is used as a photographic subject tracking device.

If such a security device is employed, then, as shown for example in FIG. 9, there may be provided a security device 200, a plurality of cameras 201, a control device 104, a memory 105, and a monitor 106. And, in a similar manner to the case with the first and second embodiments described above, it may be arranged for the control device 104 to execute the photographic subject tracking program, and thereby to perform photographic subject tracking between the images of each frame inputted in time series from the cameras 201, so as to identify any suspicious person who enters into the facility. At this time, it would also be acceptable to provide a plurality of monitors 106, so that monitoring can be performed with this plurality of monitors 106. Moreover, as the photographic subject tracking device, it would also be possible to employ a portable telephone with an incorporated camera or the like.

Figure 10:
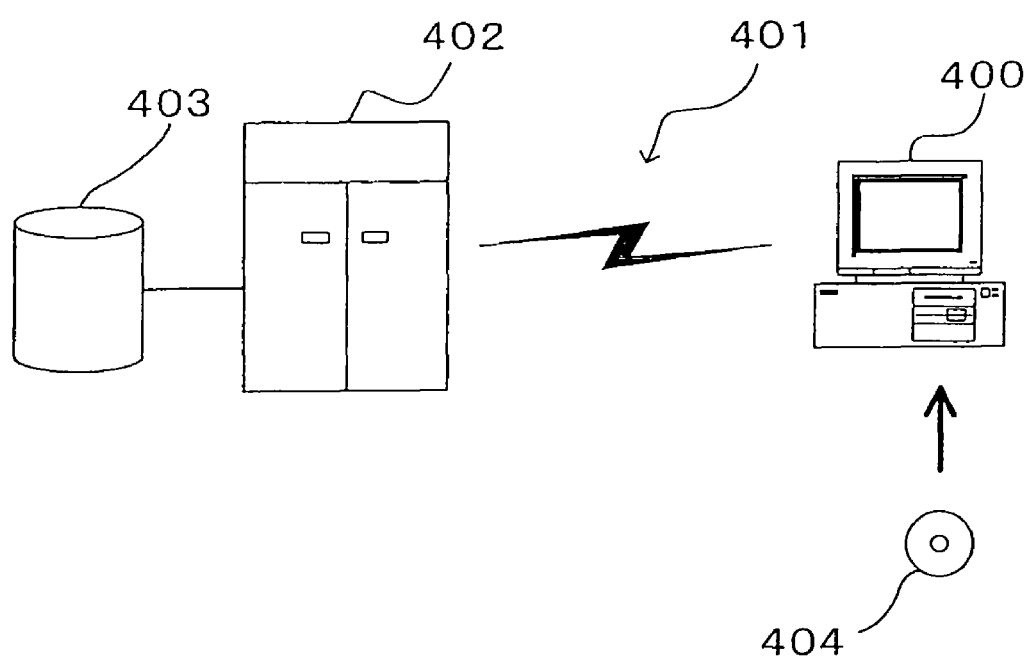
FIG. 10 is a figure showing a situation in which a program is supplied to a personal computer.

(7) Moreover, when the present invention is to be applied to a personal computer or the like, the photographic subject tracking program described above may be supplied upon a recording medium such as a CD-ROM or the like, or via a data signal such as the internet or the like. FIG. 10 is a figure showing this situation. A personal computer 400 receives supply of the program via a CD-ROM 404. Moreover, the personal computer 400 is endowed with a function of connection to a communication circuit 401. A computer 402 is a server computer that supplies the program described above, and stores this program upon a recording medium such as a hard disk 403 or the like. The communication circuit 401 is a communication circuit such as the internet or a personal computer communication link or the like, or is a dedicated communication circuit or the like. The computer 402 reads out the program using the hard disk 403, and transmits the program to the personal computer 400 via the communication circuit 401. In other words, the program is embodied as a data signal upon a carrier wave, and is transmitted via the communication circuit 401. In this manner, the program may be supplied as a computer-readable computer program product in various forms, such as a recording medium or a carrier wave or the like.

While, in the above description, various embodiments and variant embodiments have been explained, the present invention is not to be considered as being limited by the details thereof. Other modes that are considered to lie within the range of the technical concept of the present invention are also included within the scope of the present invention.

The contents of the disclosure of the following priority patent application are incorporated herein by reference:
Japanese Patent Application No. 2006-308940 (filed on Nov. 15, 2006)

The invention claimed is:

1. A non-transitory computer program product that stores a program executed by a computer for tracking the movement of a photographic subject over an image consisting of a plurality of frames inputted in time series, the program comprising:
   a template matching instruction for performing template matching upon each frame of an input image with each of a plurality of template images and extracting a plurality of regions whose similarities with each of the template images are the highest from within the input image;
   a classification instruction for classifying the extracted regions into regions that are to be used for specifying a photographic subject position within the input image and another region, on the basis of the mutual distances between the extracted regions within the input image;
   a specification instruction for specifying the photographic subject position, on the basis of the positions of the regions that have been classified by the classification instruction as the regions that are to be used for specifying the photographic subject position within the input image; and
   a photographic subject tracking instruction for tracking the movement of the photographic subject over the image consisting of a plurality of frames, by tracking the photographic subject position between frames.

2. The non-transitory computer program product according to claim 1, wherein
   the classification instruction is arranged to take a group of half or more of regions whose mutual distances are closer among the extracted regions, as being the regions to be used for specifying the photographic subject position.

3. The non-transitory computer program product according to claim 2, wherein
   the specification instruction is arranged to specify the position of the barycenter between representative points that are set within the regions used for specifying the photographic subject position, as being the photographic subject position.

4. The non-transitory computer program product according to claim 2, wherein each of the template images includes a plurality of template images for updating that have been photographed at different times, the program further comprising:

a decision instruction for deciding whether or not the result of matching by the template matching instruction satisfies an update condition for updating the template images for updating; and an updating instruction for updating at least one of the template images for updating, if it is decided by the decision instruction that the update condition is satisfied.

5. The non-transitory computer program product according to claim 1, wherein the specification instruction is arranged to specify the position of the barycenter between representative points that are set within the regions used for specifying the photographic subject position, as being the photographic subject position.

6. The non-transitory computer program product according to claim 5, wherein each of the template images includes a plurality of template images for updating that have been photographed at different times, the program further comprising:

a decision instruction for deciding whether or not the result of matching by the template matching instruction satisfies an update condition for updating the template images for updating; and an updating instruction for updating at least one of the template images for updating, if it is decided by the decision instruction that the update condition is satisfied.

7. The non-transitory computer program product according to claim 1, wherein each of the template images includes a plurality of template images for updating that have been photographed at different times, the program further comprising:

a decision instruction for deciding whether or not the result of matching by the template matching instruction satisfies an update condition for updating the template images for updating; and an updating instruction for updating at least one of the template images for updating, if it is decided by the decision instruction that the update condition is satisfied.

8. A photographic subject tracking device, comprising an execution unit that executes:

performing template matching upon each frame of an input image consisting of a plurality of frames with each of a plurality of template images;

extracting a plurality of regions whose similarities with each of the template images are the highest from within the input image;

classifying the extracted regions into regions that are to be used for specifying a photographic subject position within the input image and another region, on the basis of the mutual distances between the extracted regions within the input image;

specifying the photographic subject position, on the basis of the positions of the regions that have been classified as the regions that are to be used for specifying the photographic subject position within the input image; and tracking the movement of a photographic subject over the input image, by tracking the photographic subject position between frames.

9. A photographic subject tracking device according to claim 8, wherein the execution unit takes a group of half or more of regions whose mutual distances are closer among the extracted regions, as being the regions to be used for specifying the photographic subject position.

10. A photographic subject tracking device according to claim 8, wherein the execution unit specifies the position of the barycenter between representative points that are set within the regions used for specifying the photographic subject position, as being the photographic subject position.

11. A photographic subject tracking device according to claim 8, wherein:

each of the template images includes a plurality of template images for updating that have been photographed at different times; and the execution unit further executes:

deciding whether or not the result of template matching satisfies an update condition for updating the template images for updating; and updating at least one of the template images for updating, if it is decided that the update condition is satisfied.

12. A camera, comprising:

an image-capturing unit that captures an image of a photographic subject consisting of a plurality of frames in time series and outputs an image signal; and an execution unit that executes:

performing template matching upon each frame of the image with each of a plurality of template images, on the basis of the image signal outputted from the image-capturing unit;

extracting a plurality of regions whose similarities with each of the template images are the highest from within the image;

classifying the extracted regions into regions that are to be used for specifying a photographic subject position within the image and another region, on the basis of the mutual distances between the extracted regions within the image;

specifying the photographic subject position, on the basis of the positions of the regions that have been classified as the regions that are to be used for specifying the photographic subject position within the image; and tracking the movement of the photographic subject over the image, by tracking the photographic subject position between frames.

13. A camera according to claim 12, wherein the execution unit takes a group of half or more of regions whose mutual distances are closer among the extracted regions, as being the regions to be used for specifying the photographic subject position.

14. A camera according to claim 12, wherein
the execution unit specifies the position of the barycenter between representative points that are set within the regions used for specifying the photographic subject position, as being the photographic subject position.

15. A camera according to claim 12, wherein:
each of the template images includes a plurality of template images for updating that have been photographed at different times; and
the execution unit further executes:
deciding whether or not the result of template matching satisfies an update condition for updating the template images for updating; and
updating at least one of the template images for updating, if it is decided that the update condition is satisfied.

\* \* \* \* \*